(12) United States Patent
Hartman et al.

(10) Patent No.: US 7,296,395 B1
(45) Date of Patent: Nov. 20, 2007

(54) ENGINE INLET AIR PARTICLE SEPARATOR WITH ACTIVE FLOW CONTROL

(75) Inventors: Peter A. Hartman, Wayne, PA (US); Edward T. Meadowcroft, Audubon, PA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 11/613,111

(22) Filed: Dec. 19, 2006

(51) Int. Cl.
*B01D 45/00* (2006.01)

(52) U.S. Cl. ............... 60/39.092; 55/306; 55/434; 244/53 B

(58) Field of Classification Search ............... 55/306, 55/307, 438, 394, 385.3, 413, 414, 437, 440; 73/861.18; 60/39.092; 95/23, 29, 267; 96/397, 96/389, 422; 244/53 B
See application file for complete search history.

(56) References Cited

U.S. PATENT DOCUMENTS

| | | | |
|---|---|---|---|
| 3,979,903 A * | 9/1976 | Hull, Jr. et al. | ......... 60/39.092 |
| 4,509,962 A | 4/1985 | Breitman et al. | |
| 4,592,765 A | 6/1986 | Breitman et al. | |
| 4,617,028 A | 10/1986 | Ray et al. | |
| 4,972,672 A * | 11/1990 | Sanderson et al. | ....... 60/39.092 |
| 5,139,545 A * | 8/1992 | Mann | ............. 55/306 |
| 5,818,625 A | 10/1998 | Hassan et al. | |
| 5,938,404 A | 8/1999 | Domzalski et al. | |
| 6,092,990 A | 7/2000 | Hassan et al. | |
| 6,234,751 B1 | 5/2001 | Hassan et al. | |
| 6,471,477 B2 | 10/2002 | Hassan et al. | |
| 6,543,719 B1 | 4/2003 | Hassan et al. | |
| 6,702,873 B2 | 3/2004 | Hartman | |
| 6,713,901 B2 | 3/2004 | Hassan et al. | |
| 6,821,090 B1 | 11/2004 | Hassan et al. | |
| 6,851,990 B2 | 2/2005 | Hassan et al. | |
| 6,860,770 B2 | 3/2005 | Hassan et al. | |
| 6,866,234 B1 | 3/2005 | Hassan et al. | |
| 6,899,302 B1 | 5/2005 | Hassan et al. | |

OTHER PUBLICATIONS

Iaccarino et al., RANS simulation of the separated flow over a bumb with active control, Center for Turbulence Research, Annual Research Briefs 2003, (http://ctr.stanford.edu/ResBriefs03/iaccarino2.pdf).*
Catalano et al., Optimization of cylinder flow control via actuators with zero net mass flux, Center for Turbulence Research, Proceedings of the Summer Program 2002. (http://ctr.stanford.edu/Summer02/catalano.pdf).*

* cited by examiner

*Primary Examiner*—Duane Smith
*Assistant Examiner*—Sonji Turner
(74) *Attorney, Agent, or Firm*—Ingrassia Fisher & Lorenz, P.C.

(57) ABSTRACT

An engine inlet air particulate separator that uses zero mass active flow control devices, and methods of using the same, are provided. The separator has a separator body that has an arcuate portion with a bight region. The separator body may have an angle $\alpha$ between centerlines in the range from about 115° to about 85°. The separator body separates into a bypass conduit and a primary air conduit, separated from each other by a splitter, downstream from the bight region, which is in fluid communication with the arcuate portion. A zero mass active flow device is in fluid communication with a third region of the separator body which is located proximate a point where the air stream would otherwise have separated from an inner wall of the particle separator.

15 Claims, 4 Drawing Sheets

FIG.1 *(PRIOR ART)*

ENGINE INLET AIR PARTICLE SEPARATOR WITH ACTIVE FLOW CONTROL

TECHNICAL FIELD

The embodiments described herein generally relate to combustion engines, and more particularly relate to separators that remove particulates from a gas stream charged to the inlet of combustion engines to support combustion of fuel.

BACKGROUND

It is known that ingestion of particulates such as sand or other debris, such as dry leaves, dust, and the like, from the environment into internal combustion engines result in engine damage requiring frequent repairs. For example, in desert environments where loose dry sand prevails, helicopter engines deteriorate at a much faster rate, due in large part to ingestion of sand and other small foreign objects.

Typically, for example, helicopter engines are protected by a variety of different methods, including conventional inertial inlet particle separators that separate particulates from air. An example of these separators 10 is shown in cross section along the path of airflow in FIG. 1. The separator 10 has a separator body 12 that has an air inlet end 14. Upon entering the inlet end 14 and flowing towards the engine (not shown) the incoming particulate-containing air, shown by arrows 30, passes through an arcuate portion 16 of the separator body 12. In the arcuate portion 16, the air flow rate is accelerated because the internal cross sectional area for flow is reduced, and the air 30 is forced to follow the arcuate curvature of portion 16. The acceleration of the airflow 30 as it follows the arcuate flow path causes particulates to separate away from the arcuate portion 16 and towards an opposite side 18. Accordingly, the particulates in incoming air 30 tend to concentrate in region 32 closer to portion 18. Thus, particulates are concentrated into a "dirtier air" 32 region. Cleaner air from which particulates have migrated, tend to concentrate in a "clean air" region 34 closer to portion 16. A splitter 35 is interposed selectively between the dirty air region 32 and the clean air region 34 to separate the airflow into two streams. The dirty air 36 is then routed to the environment while the cleaned air 38 flows to the engine inlet for supporting combustion of fuel.

Under environmental conditions where dust, sand and other particulates are present in unusually high concentrations in the air, the separation efficiency of such inertial particle separators is not adequate to protect engines. Frequent engine overhauls are necessary as a consequence of particulate damage. Engines in equipment other than helicopters often suffer from the same particulate-related damage.

Installation losses (e.g. in intake air total pressure) and space-efficient packaging are important issues in the protection of engines from particulate erosion. Currently the most compact, lowest-weight system of foreign object damage protection is an inertial inlet particle separator. When higher efficiency particulate separation is required, other systems, such as vortex tubes and barrier filters, may be used in conjunction with an inertial inlet particle separator. However, these other systems come with substantial installation losses, weight increases and attendant aircraft performance penalties.

Accordingly, it is desirable to provide a high efficiency engine inlet air particulate separator to separate particulates from incoming air to be charged to combustion engines. In addition, it is desirable that the separator be easily retrofitted to existing equipment and resistant to clogging by separated particulates. For certain applications, light weight and/or compact packaging are also desirable. Furthermore, other desirable features and characteristics of the high efficiency particulate separators will become apparent from the subsequent detailed description and the appended claims, taken in conjunction with the accompanying drawings and the foregoing technical field and background.

BRIEF SUMMARY

An exemplary embodiment provides an engine inlet air particulate separator. The separator has a separator body that has an arcuate portion with a bight region. The separator body has a divided region, including a primary air conduit and a bypass conduit, in fluid communication with the arcuate portion and located downstream from the bight region. A splitter separates the primary air conduit from the bypass conduit, the former for clean air and the latter for "dirty air." At least one active mass flow control device is in fluid communication with the separator and is located proximate a point where the air stream would otherwise have separated from an inner wall of the particle separator.

An exemplary embodiment of a method provides for separating particulates from an air stream containing particulates. The method includes using active mass pulsation to preclude boundary layer separation induced by flowing the air stream in an arcuate flow path. In some embodiments zero mass active pulsation is applied to the air stream. The air stream is separated into a first stream that includes a higher mass of particulates, and a second stream that is substantially free of particulates.

BRIEF DESCRIPTION OF THE DRAWINGS

Various embodiments will hereinafter be described in conjunction with the following drawing figures, which are schematic and not to scale, wherein like numerals denote like elements.

DETAILED DESCRIPTION

The following detailed description is merely exemplary in nature and is not intended to limit the described embodiments or the application and uses of the described embodiments. Furthermore, there is no intention to be bound by any expressed or implied theory presented in the preceding technical field, background, brief summary or the following detailed description.

There is currently a pressing need to protect engines of helicopters, trucks, and mobile platforms, and other vehicles in desert environments where the air contains particulates in much higher concentration than expected in temperate zones. The particulates are not only present in high concentrations in the air, but also vary greatly in size. Regardless of size, the particulates are abrasive and cause significant engine damage when they slip past the conventional engine inlet air particulate removal systems and into the engine. This results in much abbreviated intervals between engine overhauls which in turn result in higher maintenance costs. Often, more spare vehicles are required because so many are under repair. Accordingly, there is a need for much higher efficiency particulate removal from engine inlet air to preserve engine integrity and reduce maintenance and repair requirements.

In the specification and claims, the terms "upstream" and "downstream" relate to the direction of air flow through an air separator. Thus, a location that is upstream relative to a specified point means a location that incoming air flow would have encountered before reaching the specified point. A location that is downstream relative to a specified point means a location that airflow will encounter after passing the specified point.

Figure 1:
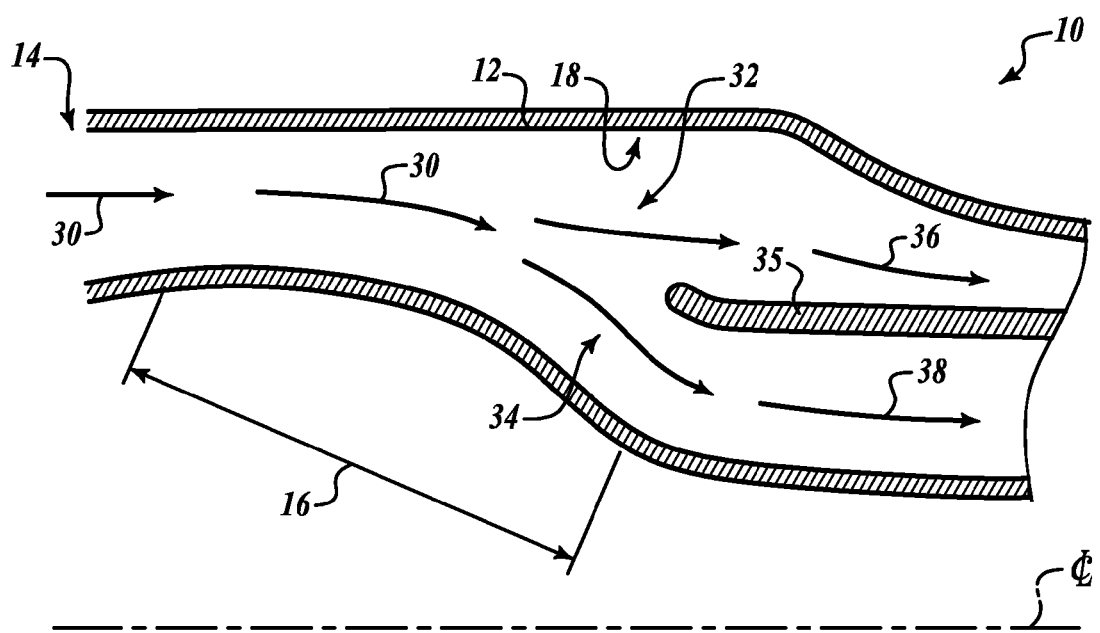
FIG. 1 is a schematic cross sectional view taken along an airflow path of a prior art inertial inlet particle separator.
Figure 2:
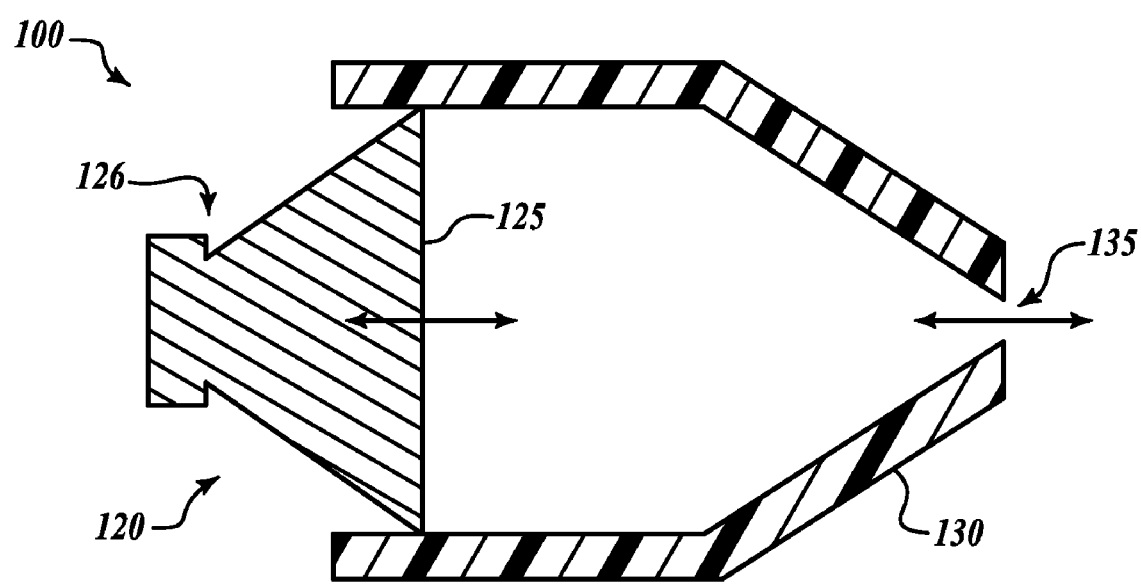
FIG. 2 is a schematic cross sectional view of a prior art zero mass active flow control device.

Exemplary embodiments of an inlet air particulate separator suitable for use in separating particulates from engine inlet air may include a mass active flow control device. The mass active flow control device may be a zero mass active flow control device, in some embodiments. An example of such a device is illustrated in FIG. 2. The mass active flow control device 100 includes a pulse generator 120 and a plenum 130 into which generated pulses are projected. The mass active flow device may include other types of devices, including without limitation devices with air injection or suction through a slot or porous plate, or a plasma or magneto-hydrodynamic device. The plenum 130 has an orifice located opposite the pulse generator 120. Air flows through the orifice 135 as pulses traverse the plenum 130 from the pulse generator 120 to the orifice 135. The amount of air pushed out of the orifice 135 on a positive pulse (higher pressure in the plenum 130 than outside the orifice 135) equals the amount of air pulled into the plenum through the orifice 135 on a negative pulse (lower pressure in the plenum 130 than outside the orifice 135). Accordingly, there is net "zero mass flow" through the zero mass active flow device 100. For non-zero mass active flow control devices, the gas for active flow control may be provided from the engine exhaust, for example, or a separate clean air inlet duct.

The pulse generator 120 includes a diaphragm 125 that may be flexible or rigid, but able to pulse at a rate of from about 1 Hz to about 10 kHz, more particularly about 200 Hz to about 800 Hz. The desired frequency might be a proportion of the natural shedding frequency of the separated flow. The diaphragm 125 may be driven by any suitable driver 126, for example, an electromechanical transducer that converts electrical energy to magnetic energy to drive the diaphragm 125. Or the diaphragm may be activated electrostatically, electromagnetically, hydraulically, pneumatically, or through the use of a piezoelectric material. The diaphragm can comprise a piezoelectric material, a rigid piston, a nickel hydroform material having a cone shape, or a variety of other shapes and compositions.

The active flow control device will require appropriate power, which translates into a specific airflow rate at a specified frequency, in order to achieve inlet pressure recovery and distortion levels. Therefore, it may be necessary in some cases to use a mechanical piston and rigid diaphragm in order to achieve desired particle separation efficiency levels.

The number of active flow control devices associated with a particular inlet air particle separator may vary widely depending upon the size of the particle separator and the area within the separator where air separation may occur from the inner wall. Therefore, while the particle separator may have an array of several active flow control devices on the back side or rear of the device, this does not limit the variety of configurations that can be implemented. The arrangement of the array may be varied to achieve best results for particular particle separators and factors including but not limited to air flow rate and speed, arctuate shape, particle size distribution, and other factors. There may be a plurality of active flow control devices ranging from 2 up to about 10 or more arrayed on any air separator, depending upon these factors. FIG. 3B shows a cross sectional view of an exemplary embodiment of an inlet air inertial particle separator 200 with a plurality of zero mass active flow devices 100, each having an orifice 135, located upstream of splitter 230 (cross section at 3B-3B of FIG. 3A). In some exemplary embodiments, the orifices 135 are narrow slits with much greater length than width.

The active flow control device may have air inlet orifices through which fluid enters into the active flow control device plenum, which may be segregated from the outlet orifices through which fluid exits the active flow control device. One-way valves may also be used to selectively turn orifices on and off.

Figure 3A:
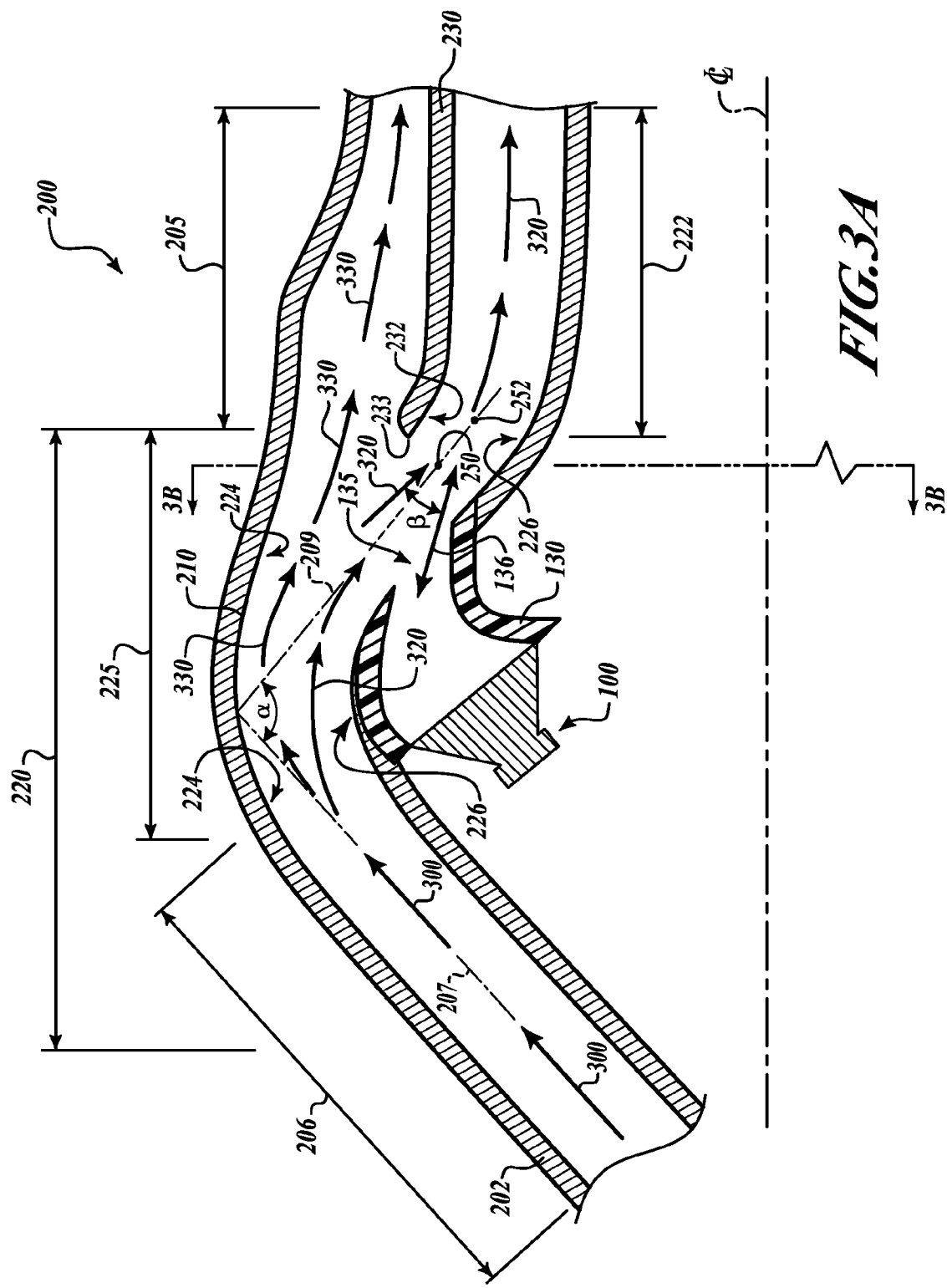
FIG. 3A is a schematic cross sectional view along an airflow path of an exemplary embodiment of this disclosure.
Figure 3B:
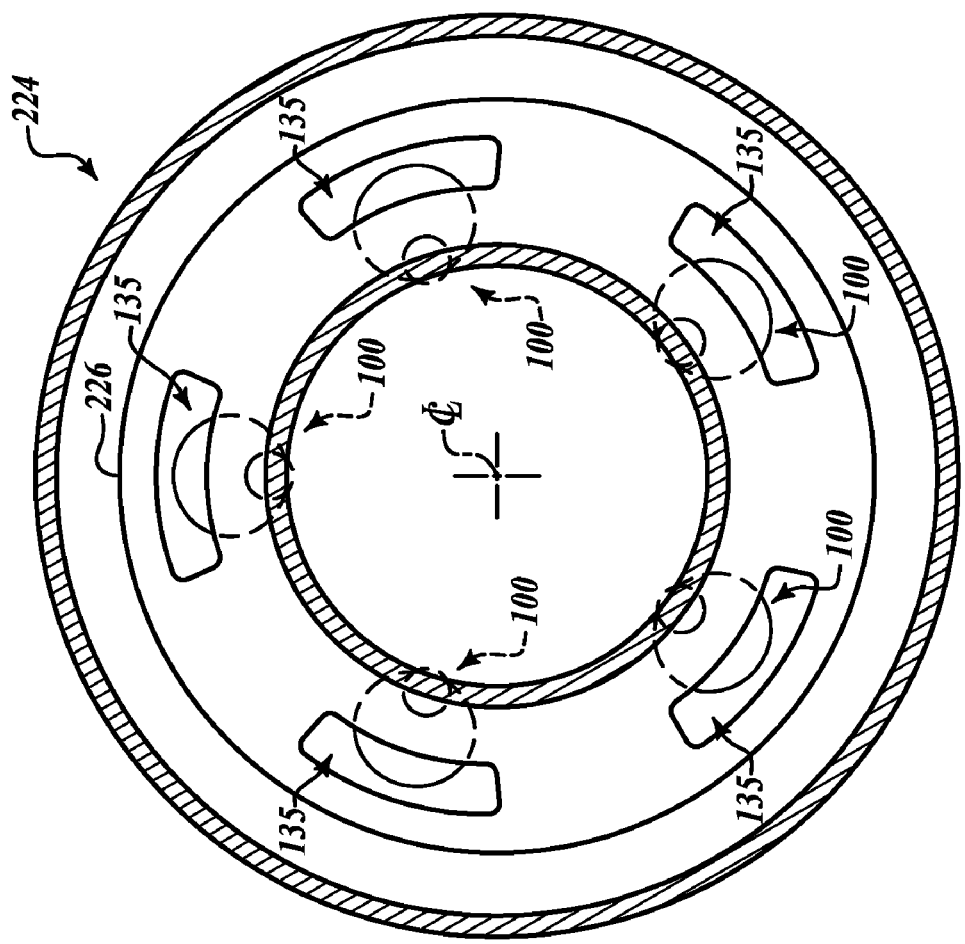
FIG. 3B is a cross sectional view taken along 3B-3B of FIG. 3A.

An exemplary embodiment of an inertial inlet air particle separator 200 is illustrated in FIG. 3A. The inlet air inertial particle separator 200 has a hollow separator body 210 configured for air flow there through. The separator body 210 of the inlet air inertial particle separator 200 extends from an air inlet end 202 of the inlet air inertial particle separator 200, to an air inlet 206, to a bight region 225 and thence to a region that is divided by a splitter 230 into a bypass conduit 205 and a primary air conduit 222. The splitter 230 extends across and divides the airflow into the inlet air inertial particulate separator 200 into two separate streams: one (clean) air stream 320 flows to the engine via primary air conduit 222, the other (particulate laden) air stream 330 flows out to the environment via bypass air conduit 205.

The separator body 210 has an arcuate convex curved body portion 220. This arctuate portion 220 has a narrow "angle between center lines $\alpha$," which is the angle found by projecting a centerline 207 of the air inlet 206 to intersect with a projected line 209 which is determined by selecting two points 250, 252 that are equidistant from inner wall 226 and surface 232 of splitter 230. The angle between centerlines $\alpha$ may range from about 85° to 115°, and preferably between 90° to 110°. However, the angle will depend upon a variety of limiting factors in installation in a particular mobile platform. The angle $\alpha$ is smaller than angles typically found in prior art devices and is one of the distinguishing features. A smaller angle $\alpha$ means that particulate-laden airflow through the separator body 210 is forced through a tighter turn, which has several effects on the air and particulate flow. The tighter turn creates the potential that airflow will separate from inner wall 226. This airflow separation from inner wall 226 may lead to a reduction of total pressure in air stream 320 going to the engine, which is undesirable. Further, a smaller angle $\alpha$ may result in higher pressure drop on air flowing through the separator body 210. Embodiments herein provide solutions that address these issues.

In FIG. 3A, a zero mass active flow device 100 has an orifice 135 in communication with the interior of the separator body to pulse air in and out of the separator body 210. The zero mass active flow device 100 is oriented such that pulses from the orifice 135 travel in air stream 136 which is directed at a small angle to the flow path of the air flowing in the separator body 210. This small angle, known as the "ejection angle β," is shown in FIG. 3A. The ejection angle β may be in the range from about 5° to about 30° degrees relative to the air stream 136. The orifice 135 communicates with the separator body 210 interior as a high profile (length much larger than width) through-hole and is located upstream of the leading end 233 of the splitter 230. The orifice 135 is desirably located proximate a point of separation of the air stream from the air stream 320 from inner wall 226, when the zero mass active flow control device 100 is not yet in place. More than one active flow control device 100 may be deployed, as shown in FIG. 3B, depending upon several factors outlined above. As many active flow control devices 100 as necessary may be deployed in an array designed to prevent air stream 320 from separating from inner wall 226. When the active flow control device(s) 100 is (are) not operating, the air stream 300 will separate from inner wall 226 near the point of orifice location, but with the active flow control device(s) operating, flow separation is eliminated.

During operation, incoming particulate-bearing air, depicted by arrows 300, is forced to make a relatively sharp turn as the air stream 300 flows into the arctuate curved body portion 220. As a result, a significant proportion of the air-borne particulates move outward, towards separator outer wall 224. The relatively sharp turn may also result in separation of the air streams 300, 320 from inner wall 226 and reduction in total pressure in the air stream 320.

As explained above, in certain embodiments, the air streams 330, 320 are subjected to a more adverse arctuate path (i.e. are forced through a smaller angle α) than in prior art systems. The more adverse arctuate path of flow causes further separation of finer particulates from air stream 300 and air stream 320 into air stream 330 due to higher centrifugal forces generated. The more adverse arctuate path of flow may cause the air flow to tend to separate the air streams 300, 320 from the inner wall 226. If this separation were to go unchecked, a proportion of the incoming air would form a recirculation zone, with attendant losses in total pressure in air stream 320. To counteract this separation and resultant total pressure reduction effect, the air stream(s) 300 and/or 320 are subjected to pulsing from one or more mass active flow device, such as zero mass active flow devices 100. As a result of the pulsing of the zero mass active flow device 100, the air that would otherwise have separated from inner wall 226 and formed a recirculation zone, remains attached to inner wall 226. Thus, because the air stream 320 remains attached to inner wall 226 according to these embodiments, the total pressure in air stream 320, which is charged to the engine, is now increased. This has a beneficial effect in that the total pressure of air stream 320 going to the engine suffers minimal total pressure loss, despite the adverse arctuate flow path in separator 200.

As shown in FIG. 3A, the splitter 230 separates the cleaned air stream 320 from the particulate laden air stream 330, which is routed out of the system to the environment. Typically, cleaned air stream 320 is from about 70% to about 90% of the incoming air flow and it is routed to the engine inlet to support combustion.

An exemplary embodiment of a method of separating particulates from an air stream containing particulates includes the steps of flowing an incoming air stream in an arcuate flow path and migrating particulates of the air stream into a first portion of the air stream. Active mass pulsation is applied to the air stream flowing in the arcuate path. The arcuate path and the active mass pulsation separate the first portion of the air stream from a lower particulate-bearing second portion of the air stream. Embodiments may include separating the first air stream from the second with a splitter. In addition. applying active pulsation may include pulsing at a frequency in the range from about 200 to about 800 Hz. The step of migrating may include flowing the air stream through a hollow separator body having an angle α between centerlines in the useful ranges from about 85° to about 115°, especially from about 90° to about 110°. Further, the step of applying active mass pulsation may include generating zero mass pulses into the air stream at an ejection angle β ranging from about 5° to about 30°.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the described embodiments in any way. Rather, the foregoing detailed description will provide those skilled in the art with a convenient road map for implementing the exemplary embodiment or exemplary embodiments. It should be understood that various changes can be made in the function and arrangement of elements without departing from the scope as set forth in the appended claims and the legal equivalents thereof.

What is claimed is:
1. An engine inlet air particulate separator, comprising:
  a separator body comprising an arcuate body portion having a bight region;
  a divided region downstream from the bight region and in fluid communication with the arcuate body portion;
  a splitter located in the divided region, the splitter creating a first region and a second region; and
  a mass active flow device in fluid communication with an interior of the separator body.

2. The separator of claim 1, wherein the mass active flow device comprises at least one zero mass active flow device.

3. The separator of claim 2, wherein the mass active flow device comprises a plenum and a diaphragm having an orifice, and wherein the diaphragm is driven to generate pulses at a frequency in a range from about 200 to about 800 Hz, when the separator is in use.

4. The separator of claim 3, wherein the diaphragm and the plenum are aligned to generate pulses into the separator body, the generated pulses directed at an ejection angle β ranging from about 5° to about 30°, when the separator is in use.

5. The separator of claim 1, further comprising a plurality of zero mass active flow devices.

6. The separator of claim 1, wherein the arcuate body portion comprises an angle between centerlines a in a range from about 110° to about 90°.

7. The separator of claim 1, wherein the arcuate body portion comprises an angle between centerlines a in a range from about 115° to about 85°.

8. The separator of claim 1, wherein the mass active flow control device comprises a diaphragm and the diaphragm generates pulses at a frequency in a range from about 200 to about 800 Hz, when the separator is in use.

9. An engine inlet air particulate separator, comprising:
  a hollow separator body comprising:
    an elongate curved body portion configured for air flow there through, the elongate curved body portion comprising a bight region;
    a divided region downstream from the bight region and in fluid communication with the elongate curved body portion;

a splitter located in the divided region, the splitter oriented such that when air flows through the hollow separator body, the splitter divides the air flow into the divided region into a first stream and a second stream; and at least one zero mass active flow device in fluid communication with an interior of the hollow separator body, the zero mass active flow device emitting pulses into the hollow separator body;

whereby, when incoming air containing particulates flows through the hollow separator body and the zero mass active flow device emits pulses into the hollow separator body, the splitter separates the incoming air into a first steam containing a higher mass of particulates and a second stream substantially free of particulates.

10. The separator of claim 9, wherein an angle $\alpha$ between centerlines is in a range from about 115° to about 85°.

11. The separator of claim 10, wherein the at least one mass active flow device comprises a plenum and a diaphragm in fluid communication with an interior of the hollow separator body and wherein the diaphragm generates pulses at a frequency in a range from about 200 to about 800 Hz, when the separator is in use.

12. The separator of claim 11, wherein the diaphragm and the plenum are aligned to generate pulses into the hollow separator body, the generated pulses directed at an ejection angle $\beta$ ranging from about 5° to about 30°, when the separator is in use.

13. The separator of claim 12, comprising a plurality of zero mass active devices.

14. The separator of claim 9, wherein the at least one mass active flow device comprises a plenum and a diaphragm in fluid communication with an interior of the hollow separator body and wherein the diaphragm is driven to generate pulses at a frequency in a range from about 200 to about 800 Hz.

15. The separator of claim 14, wherein the diaphragm and the plenum are aligned to generate pulses into a separator body interior, the generated pulses directed at an ejection angle $\beta$ ranging from about 5° to about 30°, when the separator is in use.

* * * * *